United States Patent [19]
Zirkel

[11] Patent Number: 6,135,349
[45] Date of Patent: Oct. 24, 2000

[54] SYSTEM AND METHOD FOR ENABLING A MERCHANT TO APPLY FOR A CREDIT CARD PROCESSING ACCOUNT USING THE INTERNET

[75] Inventor: George S. Zirkel, North Babylon, N.Y.

[73] Assignee: First Data Corporation, Hackensack, N.J.

[21] Appl. No.: 09/241,237

[22] Filed: Feb. 1, 1999

[51] Int. Cl.$^7$ .................................................. G06F 17/00
[52] U.S. Cl. .............................................. 235/375; 705/38
[58] Field of Search ................................. 235/380, 379, 235/375, 492; 705/1, 38, 35, 39, 42, 43, 26

[56] References Cited

U.S. PATENT DOCUMENTS

| | | | |
|---|---|---|---|
| 5,826,241 | 10/1998 | Stein et al. | 705/26 |
| 5,940,809 | 8/1999 | Musmanno et al. | 705/35 |
| 5,940,811 | 8/1999 | Norris | 705/38 |
| 6,023,698 | 2/2000 | Lavey, Jr. et al. | 707/10 |

*Primary Examiner*—Thien M. Le
*Attorney, Agent, or Firm*—Brooks & Kushman P.C.

[57] ABSTRACT

A system and method for enabling a merchant to apply for a credit card processing account using the Internet includes a computer browser in communication with the Internet. An Internet information server is in communication with the computer browser over the Internet. The Internet information server provides HTML pages on the computer browser for a merchant to enter credit card processing account information. A processor is in communication with the Internet information server to process the credit card processing account information to determine whether to grant the merchant a credit card processing account.

2 Claims, 5 Drawing Sheets

General Information

Business Name:

Legal Business Name:

Street Address: (No PO Boxes Please)

Attention To:

60

City:

State:

Zip:

Telephone: (9999999999)

Fax Number: (9999999999)

Signer (Name of Contacting Person):

Title: [President ▽]

E-Mail Address:

Internet Store or Site Address (URL):

Tell us about your store:
Zone: [Business District ▽]  Location: [Mall ▽]  Type of Ownership: [Sole Proprietorship ▽]

State Inc. or Primary State of Operation:

Federal Tax ID or SS#: (999999999)

Date Business began: (MM/YYYY)

Number of Employees:

What does your business sell:

Provide Sales Estimates
Number of Employees:
$[        ],000.00

Sales Tax: [  ▽] (%)

Refund policies (if applicable)
☐ Exchange
☐ Store Credit
☒ MC/Visa Refund

If refund, # of days to provide: [0-3 Days ▽]

MC/Visa sales are submitted at: [Date of Order ▽]

Tell us about your Business Procedures:
What % of your sales are from:
Internet: [100] (%)  Mail Order and Telephone Order: [100] (%)  In Store: [100] (%)  = 100%  = 100%

On average, your products are delivered in:
0-7 Days: [  ] (%)  8-14 Days: [  ] (%)  15-30 Days: [  ] (%)  30+ Days: [  ] (%)  = 100%

Catalog ☐   TV/Radio ☐   Newspaper or Magazine ☐   Internet ☐   Brochure or Mail ☐

Do you use a third party to distribute (Fulfill) your orders? If so, please complete the following section:

Fulfillment Provider Name:

Street:

City:

State:

Zip:

Do you currently accept credit cards? If so, please provide the information below on your current processor:

Current Processor Name:

Phone #: (9999999999)

Please use these Navigation Buttons to complete the application steps......

[① General Information] [② References] [③ Banking Information] [④ Choose Card Types] [⑤ Service Fee] [⑥ Submit Application] [Cancel]

Owner and Reference Information

Provide the following information regarding the Owner(s), Partner(s), or Officer(s) of your business. This information is mandatory, even if it is the same as previously provided information...

First Owner / Partner / Officer

| First Name: | Middle Name: | Last Name: |
|---|---|---|
| [ ] | [ ] | [ ] |

| Street: | City: | State: |
|---|---|---|
| [ ] | [ ] | [ ] |

| Zip: | Phone: (9999999999): | Title: |
|---|---|---|
| [ ] | [ ] | [President ▽] |

SSN: (999999999)
[ ]

Second Owner / Partner / Officer

| First Name: | Middle Name: | Last Name: |
|---|---|---|
| [ ] | [ ] | [ ] |

| Street: | City: | State: |
|---|---|---|
| [ ] | [ ] | [ ] |

| Zip: | Phone: (9999999999): | Title: |
|---|---|---|
| [ ] | [ ] | [President ▽] |

SSN: (999999999)
[ ]

Bank Reference Information - Please estimate if necessary

| Bank Name: | Street: | City: |
|---|---|---|
| [ ] | [ ] | [ ] |

| State: | Zip: | Bank Contact: |
|---|---|---|
| [ ] | [ ] | [ ] |

Date Relationship Started: Telephone: (9999999999) Are you a Borrower: Yes No
[ ] [ ]
(MMDDYYYY)

| Average Balance: (Numbers only) | Total loads: (Numbers only) | Total Other Balances: (Numbers only) |
|---|---|---|
| [ ] | [ ] | [ ] |

Please use these Navigation Buttons to complete the application steps......

General Information ① | References ② | Banking Information ③ | Choose Card Types ④ | Service Fee ⑤ | Submit Application ⑥ | Cancel ⑦

Banking Information

Reminder: The DDA (checking account) and ABA (routing) numbers are extremely important to credit your checking account for your store's sales. Please verify this information before continuing.

ABA#: [      ]          DDA#: [      ]

⑯:044000037⑯: 000000000· 0151

ABA NUMBER    DDA NUMBER

Please use these Navigation Buttons to complete the application steps......

Choose Card Types

Choose the card types you would like to accept on your Web site. MasterCard® and Visa® are assumed and automatically setup. We will also automatically setup Diners Club® unless you click on the card type to remove it as a payment option...

☒ MASTERCARD®
☒ VISA®
☐ AMERICAN EXPRESS®
　If you don't have an American Express  Number and
* would like us to apply for you, please check here... ☐
　Otherwise, please provide us with your existing
* Account Number... [      ]
☒ DINERS CLUB®

Please use these Navigation Buttons to complete the application steps......

*Fig. 6*

SYSTEM AND METHOD FOR ENABLING A MERCHANT TO APPLY FOR A CREDIT CARD PROCESSING ACCOUNT USING THE INTERNET

TECHNICAL FIELD

The present invention relates generally to systems and methods for applying for processing accounts and, more particularly, to a system and method for enabling a merchant to apply for a credit card processing account using the Internet.

BACKGROUND ART

Merchants allow customers to use credit cards to purchase goods and services. Many merchants now have sites on the Internet which allow customers to purchase goods and services on-line using a credit card. After the customer places an order with a merchant and submits a credit card number for payment of the order, a third party provider subsequently processes the order to debit the customer's credit card account and to credit the merchants bank or checking account. Typically, customer representatives of the provider solicit merchants to select the provider to process the credit card orders. A problem with this approach is that it requires a great deal of labor and is inefficient in that each possible merchant needs to be directly solicited. Merchants now expect to be able to obtain whatever they wish for by using the Internet. Thus, what is needed now is a system and method for enabling merchants to apply for a credit card processing account using the Internet.

SUMMARY OF THE INVENTION

Accordingly, it is an object of the present invention to provide a system and method for enabling merchants to apply for a credit card processing account using the Internet.

In carrying out the above object and other objects, the present invention provides a system for enabling a merchant to apply for a credit card processing account using the Internet. The system includes a computer browser in communication with the Internet. An Internet information server is in communication with the computer browser over the Internet. The Internet information server provides HyperText Markup Language (HTML) pages on the computer browser for a merchant to enter credit card processing account information. A processor is in communication with the Internet information server to process the credit card processing account information to determine whether to grant the merchant a credit card processing account.

Further, in carrying out the above object and other objects, the present invention provides a method for enabling a merchant to apply for a credit card processing account using the Internet. The method includes providing HTML pages on the Internet for a merchant to enter credit card processing account information. The Internet is then browsed with a computer browser in communication with the Internet to receive HTML pages. The credit card processing account information on the HTML pages is then entered. The credit card processing account information is then processed to determine whether to grant the merchant a credit card processing account.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIGS. 3, 4, 5, and 6 illustrate HTML pages which are displayed on a computer browsing the Internet for a merchant to enter application information.

BEST MODES FOR CARRYING OUT THE INVENTION

Figure 1:
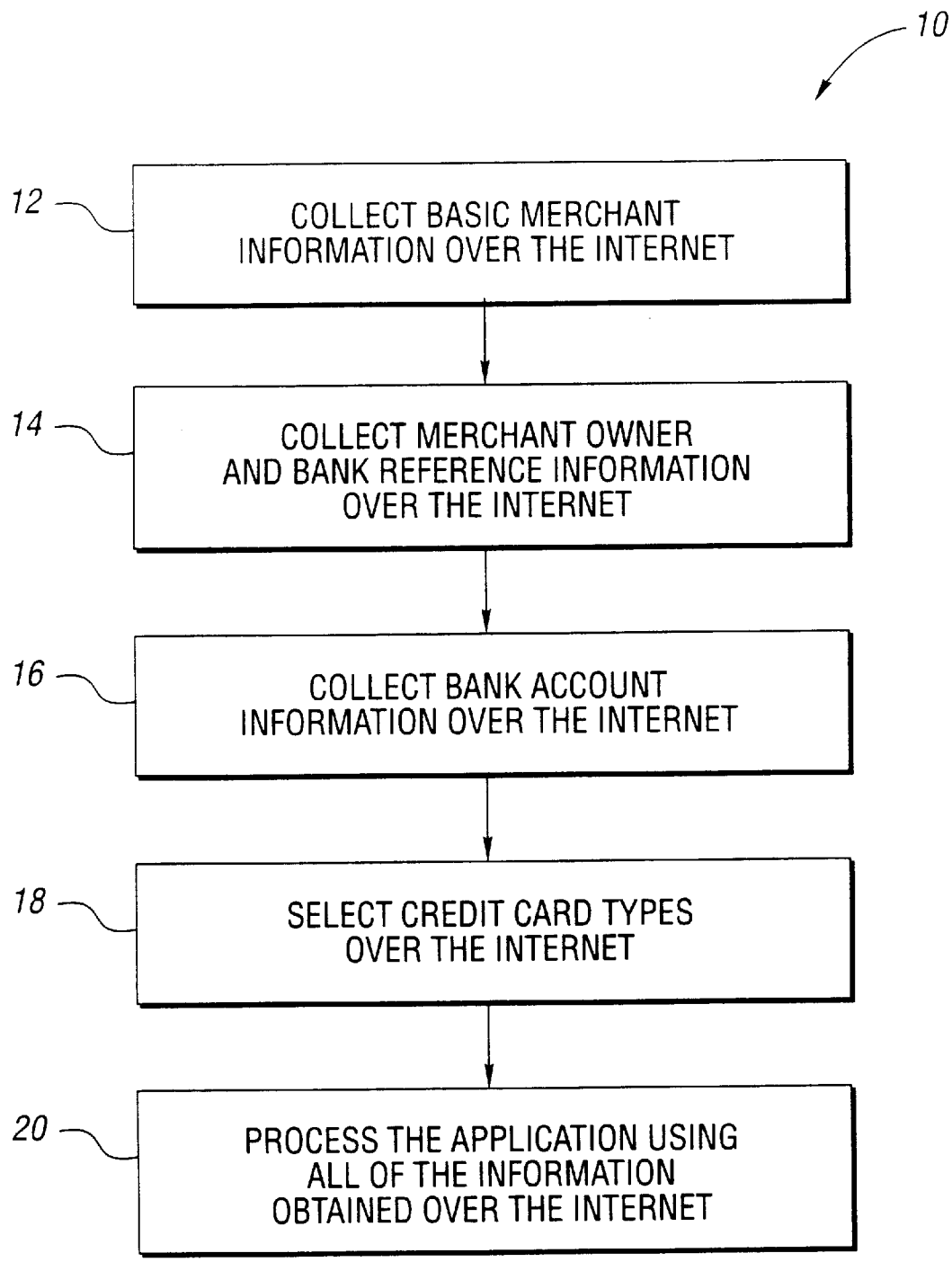
FIG. 1 illustrates a flow diagram representing operation of a system and method according to the present invention.

Referring now to FIG. 1, a flow diagram 10 representing operation of a system and method according to the present invention is shown. In general, flow diagram 10 provides a means by which a merchant can directly apply for a processing account from a provider over the Internet. Initially, block 12 prompts a merchant via a HyperText Markup Language HTML page on the Internet to enter basic information about the merchant. The requested basic merchant information includes the name and address of the business, the type of business, the goods and services sold by the business, the total estimated sales of the business over a given time period, the refund policies of the business, where the sales of the business occur, the type of advertising done by the business, etc.

Block 14 then prompts the merchant via an HTML page on the Internet to enter merchant owner and banking information. The requested merchant owner and banking information includes the names and titles of the owners and officers of the business and the name of the bank that is handling the savings and checking accounts of the business.

Block 16 then prompts the merchant via an HTML page on the Internet to enter bank account information. The requested bank account information includes the demand deposit account (DDA) number and the transmit routing number (ABA) for the merchant's bank account. The DDA number represents the individual business bank account that is credited or debited for deposits, fees, and adjustments. The ABA routing number directs electronic automated clearing house deposits to the proper bank institution. Block 18 then prompts the merchant via an HTML page on the Internet to enter the credit card types that the merchant wishes to accept from customers for payment of goods and services. The requested credit card types include the most popular credit cards currently available. Block 20 then processes the merchant application using all of the information obtained over the Internet.

Figure 2:
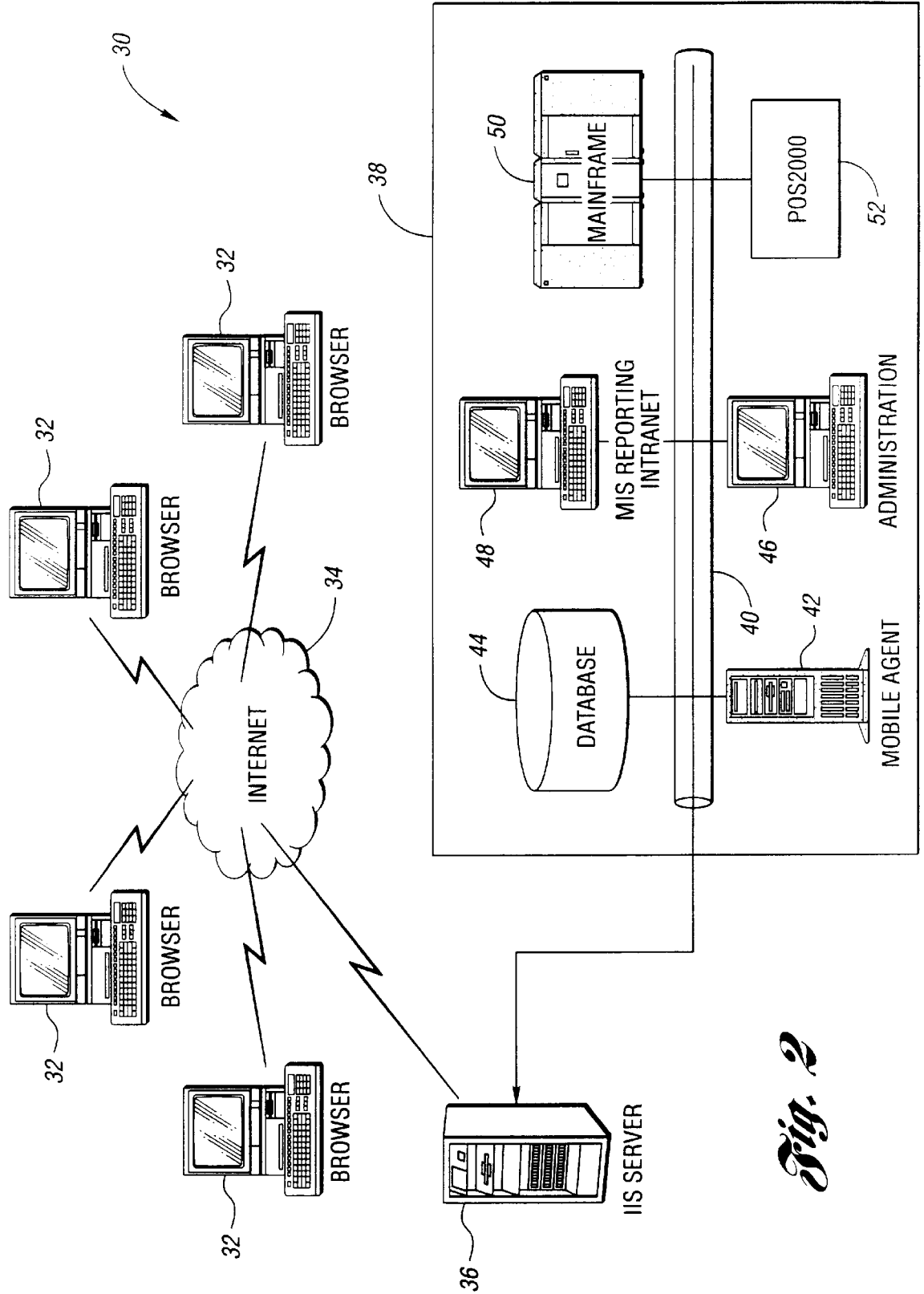
FIG. 2 illustrates a system for carrying out the method of the present invention.

Referring now to FIG. 2, a system 30 for carrying out the method of the present invention is shown. System 30 includes a plurality of personal computers 32 having Internet browsers in communication with the Internet 34. Merchants use personal computers 32 to directly apply for a processing account via Internet 34. Merchants enter the information requested as described with reference to FIG. 1 using personal computers 32. An Internet information server (IIS) 36 in communication with the Internet 34 receives the HTML pages having the requested information. IIS 36 does not edit any of the incoming HTML pages. IIS 34 processes the HTML data from the merchants to determine the presence of all required information on the HTML pages. If an HTML page is lacking the required information, then IIS 36 transmits the HTML page back to computer 32 and requests the merchant to enter more information. Upon a properly completed application being submitted with the requisite information, IIS 36 writes the information to a temporary directory stored on the IIS. All information transmitted between computers 32 and IIS server 36 is encrypted via VeriSign Secure Server Digital IDS. Upon submission of the final HTML page, IIS 36 transmits a merchant transaction identifier that was assigned to the merchant application. The merchant will then be able to refer to the transaction identifier when inquiring about the application.

System 30 further includes a back end processing unit 38. Back end processing unit 38 is in communication with IIS 36 via a communications network 40. Back end processing unit 38 includes a mobile agent 42, a database 44, an administration computer 46, a MIS reporting Intranet 48, a mainframe 50, and a POS 2000 unit 52.

Mobile agent 42 collects the data stored on the temporary directory of IIS 36 for subsequent processing. Mobile agent 42 is a set of applications that process submitted merchant applications. Mobile agent 42 also includes a synchronization process for creating different bank profiles on IIS 36. After processing, mobile agent 42 stores the data on database 44. Mobile agent 42 runs on a Windows NT platform. The functionality of mobile agent 42 includes the following constantly running processes: a process monitor, a restart monitor, a user area handler inbox, an AMEX handler, a TRACES handler, a mainframe handler, a POS 2000 handler, and a user area handler output.

The process monitor is the first application initialized within the mobile agent structure and is the application that must reside in the startup group under Windows NT. It is the primary control mechanism in bringing up other components of mobile agent 42 and ensures that all necessary processes are running.

The restart monitor constantly checks for the existence and proper functioning of the process monitor. If the restart monitor determines that the process monitor is not running it will restart it. This only occurs in the case of a fairly serious error condition. Restart monitor also allows the on line process to be remotely restarted.

The user area handler inbox constantly searches the inbox directories for active users for newly submitted applications that need to be processed. Upon finding a new application, the data is encrypted, further refined with additional data elements/defaults and loaded in database 44 for use by other handlers further downstream.

The AMEX handler obtains new applications from the user area handler inbox and determines whether the merchant is requesting a new AMEX merchant number or does not require one. The merchant number is a number that identifies each merchant to the merchant processor for accounting and billing purposes. If a number is needed, a request for an AMEX is formatted in accordance with a predefined layout and is transmitted to an AMEX TCP/IP listener. AMEX then sets up the merchant for processing and returns the merchant specific information needed.

The TRACES handler includes tables read by other processes for the generation of MIS reports. The mainframe handler takes the data from database 44 and creates a record for remission to mainframe 50. For approved accounts, the POS 2000 handler takes primarily equipment and supplies data and creates a record (in the same format as TRACES). The user area handler output monitors the movement of an account through the mobile agent processes and reports major steps, failures, and successes back to a merchant representative.

The functionality of mobile agent 42 also includes a mobile agent synchronization process which runs on demand. Synchronization is a scheduled process that runs periodically to update necessary files and to retrieve information from other sources. Examples include: 1) merchants added during the day are moved to active files; 2) changes in bank specific information is populated to files that are retrieved by merchants the next day; and 3) refreshed data, like new sales people or ABA numbers, from key TRACES tables is moved from the TRACES tables to database 44.

Administration computer 46 is used to manage individual bank profiling. Administration computer 46 populates database 44 with each banks specific data. MIS reporting Intranet 48 provides MIS reports related to the merchant applications.

Referring now to FIGS. 3, 4, 5, and 6, with reference to FIG. 1, the HTML pages which are displayed on computer 32 for a merchant to enter information are shown. FIG. 3 illustrates a HTML page 60 for collecting basic merchant information as described in block 12 of FIG. 1. FIG. 4 illustrates a HTML page 70 for collecting merchant owner and bank reference information as described in block 14 of FIG. 1. FIG. 5 illustrates a HTML page 80 for collecting basic account information as described in block 16 of FIG. 1. FIG. 6 illustrates a HTML page 90 for allowing a user to select credit card types as described in block 18 of FIG. 1.

Thus it is apparent that there has been provided, in accordance with the present invention, a system and method for enabling a merchant to apply for a credit card processing account using the Internet, that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for enabling a merchant to apply for a credit card processing account using the Internet to open a credit card processing account with a third party provider for the third party provider to process credit card orders made by customers with the merchant, the system comprising:

a computer browser in communication with the Internet;

an Internet information server in communication with the computer browser over the Internet, the Internet information server providing HTML pages on the computer browser for a merchant to submit credit card processing account information to the Internet information server, wherein the submitted credit card processing account information includes banking information of a bank associated with the merchant the banking information being a function of a bank profile of the bank associated with the merchant, the bank profile being in the Internet information server; and a processor in communication with the Internet information server to process the credit card processing account information to determine whether to grant the merchant a credit card processing account with the third party provider, wherein the processor includes a mobile agent for creating bank profiles in the Internet information server, each bank profile being associated with a respective bank.

2. A method for enabling a merchant to apply for a credit card processing account using the Internet to open a credit card processing account with a third party provider for the third party provider to process credit card orders made by customers with the merchant, the method comprising:

providing a computer browser in communication with the Internet;

providing an Internet information server in communication with the computer browser over the Internet;

browsing the Internet with the computer browser to receive HTML pages from the Internet information server;

entering credit card processing account information of a merchant into the HTML pages to submit the credit card processing account information to the Internet information server, wherein the submitted credit card processing account information includes banking information of a bank associated with the merchant, the banking information being a function of a bank profile of the bank associated with the merchant, the bank profile being in the Internet information server;

providing a processor in communication with the Internet information server;

processing the credit card processing account information with the processor to determine whether to grant the merchant a credit card processing account with the third party provider; and creating bank profiles in the Internet information server using a mobile agent of the processor, wherein each bank profile is associated with a respective bank.

* * * * *